(12) United States Patent
Lim

(10) Patent No.: US 6,650,342 B1
(45) Date of Patent: *Nov. 18, 2003

(54) METHOD FOR OPERATING NETWORK MANAGEMENT SYSTEM IN A GRAPHIC USER INTERFACE ENVIROMENT AND NETWORK MANAGEMENT SYSTEM

(75) Inventor: Bum-Jong Lim, Seoul (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/344,369

(22) Filed: Jun. 25, 1999

(30) Foreign Application Priority Data

Jun. 30, 1998 (KR) .............................. 98-25471

(51) Int. Cl.$^7$ .............................................. G06F 13/00
(52) U.S. Cl. ....................................... 345/736; 345/772
(58) Field of Search ................................. 345/736, 737, 345/738–739, 734–735, 771–773, 859–861, 748–749, 710, 766; 379/201; 709/206, 227, 223, 400; 713/100

(56) References Cited

U.S. PATENT DOCUMENTS

| | | | |
|---|---|---|---|
| 5,295,244 A | | 3/1994 | Dev et al. |
| 5,375,199 A | | 12/1994 | Harrow et al. |
| 5,436,909 A | | 7/1995 | Dev et al. |
| 5,504,921 A | | 4/1996 | Dev et al. |
| 5,517,655 A | * | 5/1996 | Collins et al. ............... 345/734 |
| 5,606,664 A | | 2/1997 | Brown et al. |
| 5,726,979 A | | 3/1998 | Henderson et al. |
| 5,742,762 A | | 4/1998 | Scholl et al. |
| 5,751,933 A | | 5/1998 | Dev et al. |
| 5,751,965 A | | 5/1998 | Mayo et al. |

(List continued on next page.)

Primary Examiner—Steven Sax
(74) Attorney, Agent, or Firm—Robert E. Bushnell, Esq.

(57) ABSTRACT

In a network management system (NMS) and a method for operating the NMS in a graphic user interface (GUI) environment, the NMS communicates in a GUI environment requiring long-time interaction, and includes: an NMS GUI unit for displaying the status or progress of a communication procedure in real-time; and an NMS communication unit activated by the NMS GUI unit only as necessary. The NMS communication unit uses a message queue of the UNIX IPC as an information channel so as to exchange information with the NMS GUI unit. The disclosed method for includes the steps of: receiving a command input from a user via the NMS GUI unit; confirming whether the input is a communication command; displaying the status or communication progress by means of the NMS GUI unit and branching to a child process for the NMS communication unit and a parent process for the NMS GUI unit when a communication command is confirmed; determining the value of the child process's ID (PID); generating a message queue for which the determined PID corresponds to an m-type queue, and sending a communication start command to the child process to display the status of waiting for the user's input, and to display the status of communication; determining its own PID value by means of the branched child process; generating a message queue for which the determined PID corresponds to an m-type queue; receiving the communication start command from the parent process using the generated message queue; starting to communicate with the target system for management via the child process in response to the received communication start command; and informing the parent process of the result through the message queue by means of the child process, and terminating that process once communication with the target system for management has been completed.

23 Claims, 4 Drawing Sheets

U.S. PATENT DOCUMENTS

| | | |
|---|---|---|
| 5,761,429 A | 6/1998 | Thompson |
| 5,761,432 A | 6/1998 | Bergholm et al. |
| 5,768,552 A | 6/1998 | Jacoby |
| 5,778,377 A | 7/1998 | Marlin et al. |
| 5,812,750 A | 9/1998 | Dev et al. |
| 5,821,937 A * | 10/1998 | Tonelli et al. ............... 345/854 |
| 5,831,610 A * | 11/1998 | Tonelli et al. ............... 345/736 |
| 5,859,978 A | 1/1999 | Sonderegger et al. |
| 5,870,558 A | 2/1999 | Branton, Jr. et al. |
| 5,887,139 A | 3/1999 | Madison, Jr. et al. |
| 5,889,954 A | 3/1999 | Gessel et al. |
| 6,020,889 A * | 2/2000 | Tarbox et al. ............... 345/736 |
| 6,243,452 B1 * | 6/2001 | O'Shaughnessey et al. . 379/201 |
| 6,377,993 B1 * | 4/2002 | Brandt et al. ................ 709/227 |
| 6,385,644 B1 * | 5/2002 | Devine et al. ............... 709/206 |

* cited by examiner

METHOD FOR OPERATING NETWORK MANAGEMENT SYSTEM IN A GRAPHIC USER INTERFACE ENVIROMENT AND NETWORK MANAGEMENT SYSTEM

CLAIM OF PRIORITY

This application makes reference to, incorporates the same herein, and claims all benefits accruing under 35 U.S.C. §§119 and 120 from an application for Method for Operating Network Management System in the Graphic User Interface Environment and Network Management System earlier filed in the Korean Industrial Property Office on Jun. 30, 1998 and there duly assigned Ser. No. 1998-25471.

TECHNICAL FIELD

The present invention relates to a network management system (NMS) and a method for operating the NMS in a graphic user interface (GUI) environment. More particularly, the invention relates to a method for operating a communication procedure requiring especially long-time interaction on a GUI program necessary for a communication procedure for interacting with other systems.

RELATED ART

As described more detailed below, various methods for implementation of communication procedures are known. One problem experienced by such methods is known as the "hang-over" problem wherein GUI interfaces cannot receive any input for a period of time during which the communication procedure is actually being performed. Certain methods strived to overcome this disadvantage. However, in overcoming this "hang-over" problem, other problems occur. For example, as a result of solving the "hang-over" problem, it is often necessary to sustain management of the communication process and to check for active status of the process. Additionally, the management of the process becomes difficult when the number of processors becomes large, such as in the case where such a method is applied to an enormous NMS system. Another problem resides in the fact that it is not easy to execute more than one instance, among various instances, of an NMS program because a predetermined message queue type is used to exchange information between the NMS GUI unit and the NMS communication unit.

The following patents are considered to be representative of the prior art relative to the invention, but are burdened by the disadvantages set forth above:

U.S. Pat. No. 5,295,244 for Network Management System Using Interconnected Hierarchies to Represent Different Network Dimensions in Multiple Display Views issued to Dev et al.; U.S. Pat. No. 5,375,199 for System Monitoring Method and Device Including a Graphical User Interface to View and Manipulate System Information issued to Harrow et al.; U.S. Pat. No. 5,436,909 for Network Management System Using Status Suppression to Isolate Network Faults issued to Devetal.; U.S. Pat. No. 5,504,921 for Network Management System Using Model-based Intelligence issued to Dev et al.; U.S. Pat. No. 5,606,664 for Apparatus And Method For Automatically Determining The Topology of a Local Area Network issued to Brown et al.; U.S. Pat. No. 5,726,979 for Network Management System issued to Henderson et al.; U.S. Pat. No. 5,742,762 for Network Management Gateway issued to Scholl et al.; U.S. Pat. No. 5,751,933 for System for Determining the Status of an Entity in a Computer Network issued to Dev et al.; U.S. Pat. No. 5,751,965 for Network Connection Status Monitor and Display issued to Mayo et al.; U.S. Pat. No. 5,761,429 for Network Controller for Monitoring the Status of a Network issued to Thompson; U.S. Pat. No. 5,761,432 for Method and Apparatus for Providing an Efficient Use of Telecommunication Network Resources issued to Bergholm et al.; U.S. Pat. No. 5,768,552 for Graphical Representation of Computer Network Topology and Activity issued to Jacoby; U.S. Pat. No. 5,778,377 for Table Driven Graphical User Interface issued to Marlin et al.; U.S. Pat. No. 5,812,750 for Method and Apparatus for Monitoring the Status of Non-Pollable Devices in a Computer Network issued to Dev et al.; U.S. Pat. No. 5,859,978 for Managing Application Programs in a Computer Network by Using a Database of Application Objects issued to Sonderegger et al.; U.S. Pat. No. 5,870,558 for Intranet Graphical User Interface for Sonet Network Management issued to Branton, Jr. et al.; U.S. Pat. No. 5,887,139 for Configurable Graphical User Interface Useful in Managing Devices Connected to a Network issued to Madison, Jr. et al.; and U.S. Pat. No. 5,889,954 for Network Manager Providing Advanced Interconnection Capability issued to Gessel et al.

SUMMARY OF THE INVENTION

The present invention is intended to provide a network management system (NMS) and a method for operating the NMS in a graphic user interface (GUI) programming environment.

The present invention has the following advantages:

First, it makes it possible to prevent all GUI interfaces from experiencing the hang-over status during execution of a communication procedure.

Second, it can solve the problems of waste of memory and overhead in the management of the communication process.

Third, it can display the status of progress or communication steps in the NMS GUI unit in real time by using the message queue of the UNIX IPC as an information channel between the NMS GUI unit and NMS communication unit.

Fourth, many instances of the NMS program can exist in such a way as to operate the NMS communication unit with the UNIX system call, fork( ), by means of the NMS GUI unit only at a time when operation of the NMS communication unit is required and additionally allocating the PID of the NMS communication unit to an m-type of message queue used for the information channel between the NMS GUI unit and the NMS communication unit.

A preferable embodiment of the NMS in a GUI environment, wherein communication units perform a communication procedure requiring long-time interaction according to the present invention, includes:

(a) an NMS GUI unit displaying the status or progress of the communication procedure in real-time; and (b) an NMS communication unit activated by the NMS GUI unit only if necessary, the NMS communication unit using a message queue of a UNIX IPC as an information channel so as to exchange information with the NMS GUI unit.

According to the NMS of the present invention, the PID of the NMS communication unit (child process) is allocated to an m-type message queue to execute a plurality of NMS program instances.

A preferable embodiment of the method according to the present invention includes the steps of:

(a) receiving a command input from a user by the NMS GUI unit;

(b) confirming whether the input is a communication command;

(c) when a communication command is confirmed, displaying the communication status or progress for the NMS GUI unit and branching to a child process for an NMS communication unit and to a parent process for an NMS GUI unit;

(d) determining the value of the child process's ID (PID) by means of the branched parent process;

(e) generating a message queue for which the determined PID corresponds to an m-type queue, and sending a communication start command to the child process by means of the parent process;

(f) returning to the NMS GUI unit to display the status of waiting for the user's input (the "Ready" state) and to display communication status for the parent process after sending the communication start command,;

(g) determining its own PID value by means of the branched child process;

(h) generating a message queue for which the determined PID corresponds to an m-type queue by means of the child process;

(i) receiving a communication start command from the parent process by means of the child process using the generated message queue;

(j) starting to communicate with the target system for management by means of the child process upon receipt of the communication start command; and (k) informing the parent process of the result through the message queue by means of the child process, and then terminating the child process when the communication with the target system for management has been completed.

According to the method of the present invention, the method further includes the steps of:

(a) sending status information to the parent process through the message queue when the child process performs communication with the corresponding target system for management; and (b) displaying the status or communication progress with the target system for communication by means of the parent process in real-time based on the sent status information.

According to the method of the present invention, the parent process displays, on a screen through the message queue in real-time, that the steps of communication have been completed, and then returns to a step of waiting for user's input as to the communication order (the "Ready" state).

According to the method of the present invention, the step of branching to a child process for an NMS communication unit and a parent process for an NMS GUI unit uses fork( ), one of the UNIX system calls.

According to the method of the present invention, the step of determining the value of the child process's ID (PID) by the branched parent process determines the value of child process's ID (PID) as a return value of calling the fork( ).

According to the method of the present invention, the step of determining its own PID value by means of the branched child process makes that determination using getid(), another one of the UNIX system calls.

According to the method of the present invention, the child process performs the process of the NMS communication unit using execl ( ), another one of the UNIX system calls.

According to the method of the present invention, the status information as to communication progress includes: an order to start downloading from the NMS GUI process to the NMS communication process; information reporting that the downloading from the NMS GUI process to the NMS communication process has started and reporting the total size of the download data and the size of data sent up to the present time; an order to stop the downloading from the NMS GUI process to the NMS communication process; a message to terminate containing information as to the reason for failure when the downloading from the NMS GUI process to the NMS communication process has failed; and a message to terminate containing the result information when the downloading from the NMS GUI process to the NMS communication process has succeeded.

DESCRIPTION OF THE PREFERRED EMBODIMENTS

Figure 1:
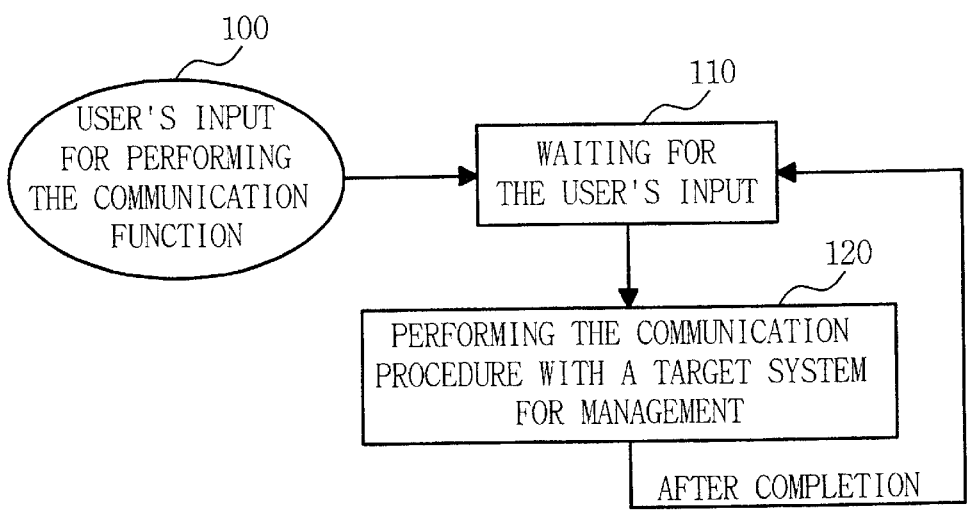
FIG. 1 is a flow chart illustrating the method for implementation of a communication procedure.

FIG. 1 is a flow chart illustrating a method for implementation of a communication procedure. As illustrated in FIG. 1, a method of inserting implementation codes for a communication procedure directly into the GUI includes the steps of: entering a user input for performing the communication function (s 100); waiting for the user's input on a NMS main window (s110); and returning to the step s110 after completion of the communication procedure or function with a target system for management, provided that the user's input has occurred (s120).

In an example of the method, the implementation codes for the communication procedure are directly inserted into a Call back routine of MOTIF Push Button Widget. This has an advantage in that the implementation of the procedure is simple. In the latter regard, the implementation displayes the status of the communication procedure and the status or current progress of the communication (for example, the rate of progress of data downloading). However, there is also a disadvantage in that there is a "hang-over status" wherein all GUI interfaces cannot receive an input for the period of time during which the communication procedure is actually being performed.

Figure 2:
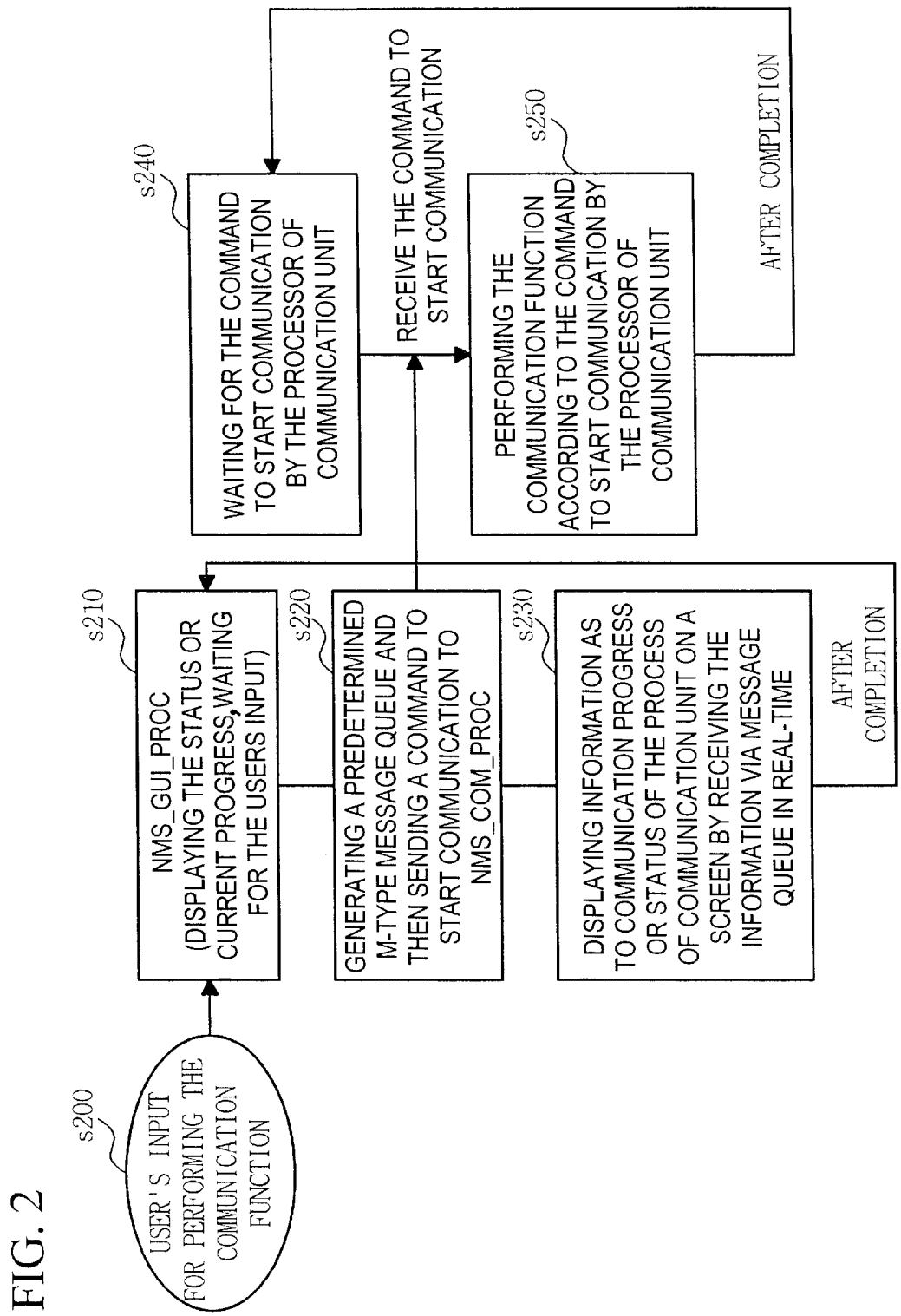
FIG. 2 is a flow chart illustrating another method for implementation of a communication procedure.

FIG. 2 is a flow chart illustrating another method for implementation of a communication procedure. Such a method previously executes a daemon process for communication and then receives a communication command from the GUI unit of the NMS via UNIX (UNIX is a trademark of AT&T) IPC (inter process or communication), such as a message queue for performing the communication function. As illustrated in FIG. 2, the method includes the steps of: entering a user input for performing the communication function (s200); displaying the status or current progress of waiting for the user's input (NMS_GUI_PROC, s210); generating a predetermined message queue by means of the NMS GUI process, and then sending a command to start communication to a processor of a communication unit (NMS_COM_PROC) (s220); waiting for the command to start communication by the processor of the communication unit (s240); performing the communication function according to the command to start communication by the process or of the communication unit (s250); and displaying information as to progress or status of communication of the process of the communication unit on a screen by receiving the information via a message queue in real-time (s230).

To implement this method, it is required that the GUI unit and the communication unit of the NMS be split into extra processes, i.e., executable programs and the daemon process for communication should always be executed in run-time. This method can solve the hang-over problem experienced with the method of FIG. 1. However, it has another problem in that it is necessary to sustain management of the daemon process for communication and to check for active status of the process. Additionally, management becomes difficult when the number of daemon processes becomes large, such as in the case where the above method is applied to an enormous NMS system. There is another problem in that it is not easy to execute more than one instance, among various instances, of an NMS program because a predetermined message queue type is used to exchange information between the NMS GUI unit and the NMS communication unit.

Figure 4:
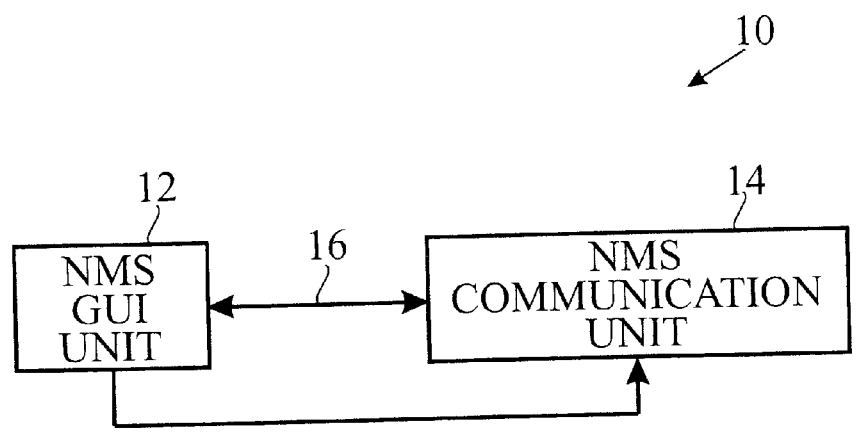
FIG. 4 is a block diagram of a network management system in accordance with the present invention.

FIG. 4 is a block diagram of a network management system in accordance with the present invention. Referring to FIG. 4, a preferable embodiment of the network management system (NMS) 10 according to the present invention operates in a graphic user interface (GUI) environment, wherein communication units perform a communication procedure requiring long-time interaction, and comprises:

(a) an NMS GUI unit 12 displaying the status or progress of the communication procedure in real-time; and (b) an NMS communication unit 14 activated by the NMS GUI unit 12 only if necessary, the NMS communication unit 14 using a message queue of a UNIX IPC (inter process communication) as an information channel 16 so as to exchange information with the NMS GUI unit 12.

In the embodiment of the invention, the process ID (PID) of the NMS communication unit (child process) 14 is allocated to an m-type message queue to execute a plurality of NMS program instances.

A preferable embodiment of a method for operating a network management system (NMS) 10 in accordance with a GUI program for a communication apparatus having NMS GUI (graphic user interface) unit 12 and an NMS communication unit 14 in the NMS system 10 on the GUI environment comprises the steps of:

(a) receiving a command input from a user by means of the NMS GUI unit 12;

(b) confirming whether the input is a communication command;

(c) as a result of confirming that it is a communication command, displaying the status or communication progress by means of the NMS GUI unit 12 and branching to a child process for an NMS communication unit 14 and a parent process for an NMS GUI unit 12;

(d) determining the value of the child process's ID (PID) by means of the branched parent process;

(e) generating a message queue for which the determined PID corresponds to an m-type queue, and sending a communication start command to the child process by means of the parent process;

(f) after sending the communication start command, returning to the NMS GUI unit 12 to display the status of waiting for the user's input (the "Ready" state), and to display the communication status by means of the parent process;

(g) determining its own PID value by means of the branched child process;

(h) generating a message queue for which the determined PID corresponds to an m-type queue by means of the child process;

(i) using the generated message queue to receive the communication start command from the parent process by means of the child process;

(j) starting to communicate with the target system for management by means of the child process upon receipt of the communication start command; and (k) when the communication with the target system for management has been completed, informing the parent process of the result through the message queue by means of the child process, and terminating the child process.

In the embodiment of the invention, the method further comprises the steps of:

(a) sending status information to the parent process through the message queue when the child process performs communication with the corresponding target system for management; and (b) displaying the status or progress of communication with the target system in real-time by means of the parent process based on the sent status information.

The parent process displays, on a screen through the message queue in real-time, that the steps of communication have been completed, and then returns to a step of waiting for the user's input of the communication order (the "Ready" state).

The step of branching to a child process for an NMS communication unit 14 and a parent process for an NMS GUI unit 12 uses fork( ), one of the UNIX system calls. The step of determining the value of the child process's ID (PID) by means of the branched parent process determines the value of the child process's ID (PID) as a return value of calling the fork( ). The step of determining its own PID value by means of the branched child process makes that determination using getid( ), another one of the UNIX system calls.

The child process performs the process of the NMS communication unit 14 using execl ( ), another one of the UNIX system calls. The status information as to communication progress includes: an order to start downloading from the NMS GUI process to the NMS communication process; information reporting that the downloading from the NMS GUI process to the NMS communication process has started, and reporting the total size of the download data and the size of data sent up to the present; an order to stop the downloading from the NMS GUI process to the NMS communication process; a message to terminate containing information as to the reason of failure when the downloading from the NMS GUI process to the NMS communication process has failed; and a message to terminate containing information as to results when the downloading from the NMS GUI process to the NMS communication process has succeeded.

Figure 3:
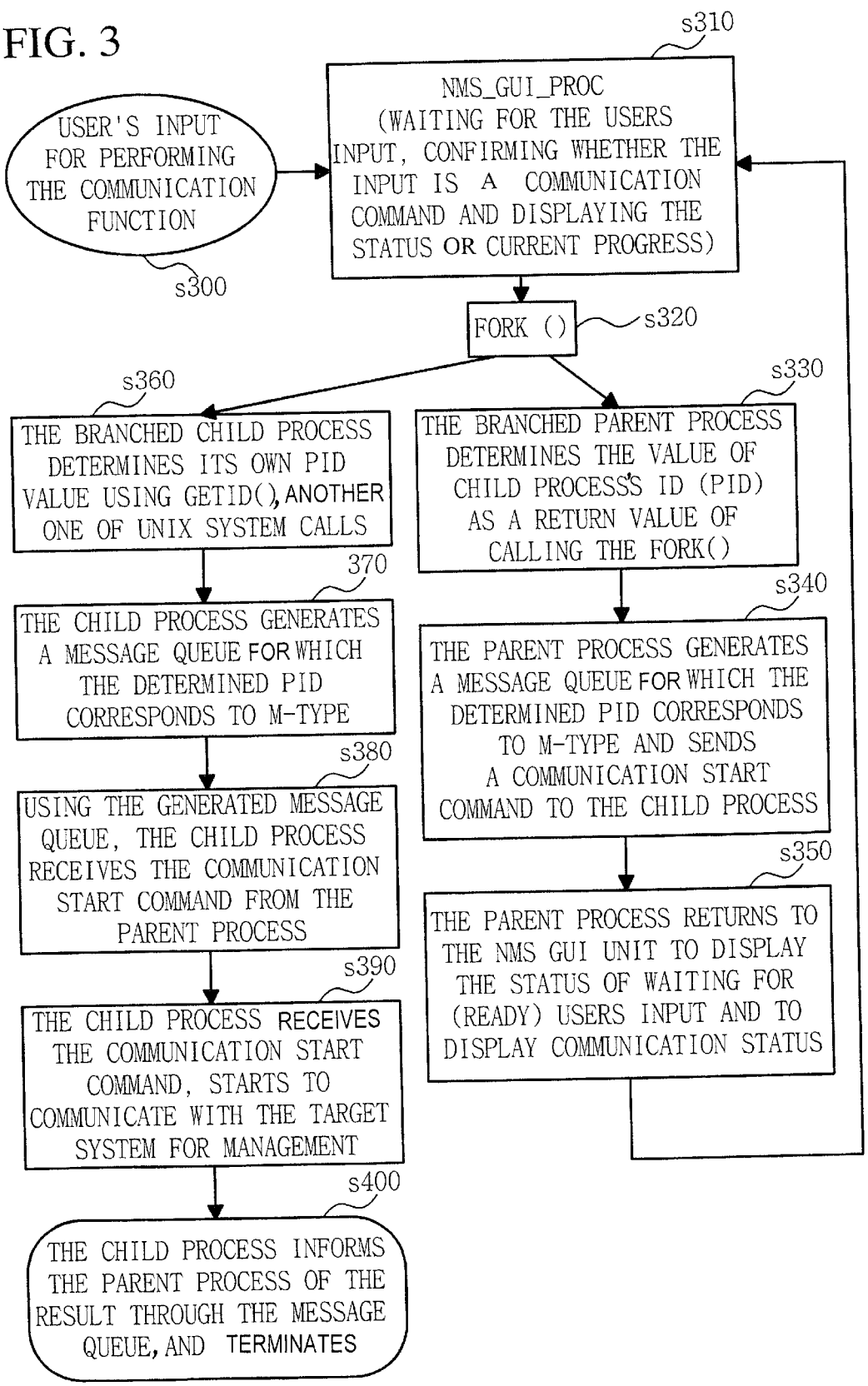
FIG. 3 is a flow chart illustrating a method for implementation of a communication procedure according to the present method.

FIG. 3 is a flow chart illustrating a method for implementation of a communication procedure according to the present invention. The composition of the present invention will be described with reference to FIG. 3. First of all, to execute a long-time communication procedure in the network management system (NMS) 10 having a graphic user interface (GUI) environment, the NMS 10 is separated into an NMS GUI unit 12 and an NMS communication unit 14. Such a separation prevents all GUI interfaces from experiencing a hang-over status in the execution of the communication procedure.

Excluding a method of waiting for a communication command from the NMS GUI unit 12 while always executing the NMS communication unit 14, there is no necessity for an upper daemon process to continue operating the NMS communication unit 14, and waste of memory is avoided in such a way as to use a UNIX system call, fork( ), by means of the NMS GUI unit 12 only at the time required for operation of the NMS communication unit 14. Additionally, defining the message queue as a process id (PID) for the NMS communication unit 14 for exchanging information between the NMS GUI unit 12 and the NMS communication unit 14 makes it possible to display the status of communication in current progress at the NMS GUI unit 12 in real time.

When downloading bulk data to the target system for management, the following can be included for the status information of communication progress being exchanged between the NMS GUI unit 12 (NMS_GUI_PROC) and the NMS communication unit 14 (NMS_COM_PROC):

command to starting downloading (NMS_GUI_PROC→NMS_COM_PROC)

started downloading (NMS_COM_PROC→NMS_GUI_PROC)

total size of download information (NMS_COM_PROC→NMS_GUI_PROC)

size of download information sent up to the present time (NMS_COM_PROC→NMS_GUI_PROC)

command to stop downloading (NMS_GUI_PROC→NMS_COM_PROC)

termination message containing information as to the reason of failure when download has failed (NMS_COM_PROC→NMS_GUI_PROC)

termination message containing information as to result when download has succeeded (NMS_COM_PROC→NMS_GUI_PROC)

As in the above, the NMS communication unit 14 is operated using the fork( ) command only at the time required for the execution of the NMS communication unit 14, and the PID of the communication unit 14 is used for an m-type of message queue to exchange information between both units and, therefore, many instances of the NMS program can exist.

Hereafter, the manner of operating the NMS 10 in a GUI programming interface environment according to the present invention will be described with reference to FIG. 3. The NMS GUI unit 12 receives a command input from a user (s300), and confirms whether the input is a communication command (s310). If it is a communication command, the NMS GUI unit 12 displays the status or communication progress and branches to a child process for an NMS communication unit 14 and a parent process for NMS GUI unit 12 using fork( ), one of the UNIX system calls (s320). The branched parent process determines the value of child process's ID (PID) as a return value of calling the fork( ) (s330).

The parent process generates a message queue for which the determined PID corresponds to an m-type queue, and sends a communication start command to the child process (s340).

After sending the communication start command, the parent process returns to the NMS GUI unit 12 to display the status of waiting for user's input (the "Ready" state) and to display the communication status (s350).

The branched child process determines its own PID value using getid( ), another one of the UNIX system calls (s360).

The child process generates a message queue for which the determined PID corresponds to an m-type queue (s370) and performs the process of the NMS communication unit 14 using execl ( ), another one of the UNIX system calls.

Using the generated message queue, the child process receives the communication start command from the parent process (s380).

Once the child process has received the communication start command, it starts to communicate with the target system for management (s390). The above method for operating the NMS further includes the step of sending status information to the parent process through the message queue when the child process performs communication with the corresponding target system for management, and the step of the parent process's displaying in real-time the status or progress of communication with the target system for communication based on the sent status information. The parent process displays, on a screen through the message queue in real-time, that the steps of communication have been completed, and then returns to the step of waiting for the user's input of the communication order (the "Ready" state). The status information as to the progress of communication includes: an order to start downloading from the NMS GUI process to the NMS communication process; information reporting that the downloading from the NMS GUI process to the NMS communication process has started and reporting the total size of the download data and the size of data sent up to now; an order to stop the downloading from the NMS GUI process to the NMS communication process; a message to terminate containing information as to the reason of failure when the downloading from the NMS GUI process to the NMS communication process has failed; and a message to terminate containing information as to results when the downloading from the NMS GUI process to the NMS communication process has succeeded.

If the communication with the target system for management has been completed, the child process informs the parent process of that result through the message queue and then terminates (s400).

The present invention, as described above, has the following advantageous effects:

First, it makes it possible to prevent all GUI interfaces from experiencing a hang-over status during execution of a communication procedure by separating the NMS 10 into an NMS GUI unit 12 and an NMS communication unit 14 for execution of the long-time communication procedure in the NMS 10 having a GUI environment.

Second, it can solve the problems of waste of memory and overhead in the management of the communication process in such a way that the NMS communication unit 14 is activated by the NMS GUI unit 12 only at a time when operation of the NMS communication unit 14 is required.

Third, it can display the status or progress of communication steps in the NMS GUI unit 12 in real time by using the message queue of the UNIX IPC as an information channel 16 between the NMS GUI unit 12 and the NMS communication unit 14.

Fourth, many instances of the NMS program can exist in such a way as to operate the NMS to communication unit 14 with the UNIX system call, fork( ), by means of the NMS GUI unit 12 only at a time when operation of the NMS communication unit 14 is required, additionally allocating the PID of the NMS communication unit 14 to an m-type of message queue used for the information channel 16 between the NMS GUI unit 12 and the NMS communication unit 14.

While the invention is susceptible to various modification and alternative forms, specific embodiments thereof have been shown by way of example in the drawings and will be described herein in detail. It should be understood, however, that it is not intended to limit the invention to the particular forms disclosed but, on the contrary, the intention is to cover all modifications, equivalents, and alternatives falling within the spirit and scope of the invention as defined by the appended claims.

What is claimed is:

1. A method for operating a network management system (NMS) in accordance with a graphic user interface (GUI) program for a communication apparatus having an NMS GUI unit and an NMS communication unit in an NMS system in a GUI environment, said method comprising the steps of:
   (a) receiving a command input from a user by means of said NMS GUI unit;
   (b) determining whether the command input is a communication command;
   (c) when the command input is the communication command, displaying status data as to communication progress by means of said NMS GUI unit and branching to a child process for the NMS communication unit and a parent process for the NMS GUI unit;
   (d) determining a value of the child process's ID (PID) by means of the branched parent process;
   (e) generating a message queue for which a determined PID corresponds to an m-type queue, and sending a communication start command to the child process by means of the parent process;
   (f) after sending the communication start command, returning the NMS GUI unit to display status data relative to waiting for a user's input, and to display communication status data by means of the parent process;
   (g) determining a PID value for the branched child process;
   (h) generating a message queue for which the determined PID value corresponds to an m-type queue by means of the child process;
   (i) using the generated message queue to receive the communication start command from the parent process by means of the child process;
   (j) starting to communicate with the target system for management by means of the child process upon receipt of the communication start command; and
   (k) when communication with the target system for management has been completed, informing the parent process of the result through the message queue by means of the child process, and terminating the child process.

2. The method as set forth in claim 1, further comprising the steps of:
   sending status information to the parent process through the message queue when the child process performs communication with the corresponding target system for management; and
   displaying status data as to communication progress with the target system in real-time by means of the parent process based on the sent status information.

3. The method as set forth in claim 2, wherein the parent process displays, on a screen through the message queue in real-time, that communication has been completed, and then returns to a step of waiting for the user's input for a communication order.

4. The method as set forth in claim 3, wherein said step of branching to the child process for the NMS communication unit and to the parent process for the NMS GUI unit comprises using a fork( ) call, one of UNIX system calls.

5. The method as set forth in claim 4, wherein said step of determining the value of the child process's ID (PID) be means of the branched parent process comprises determining the value of the child process's ID (PID) as a return value of the fork( ) call.

6. The method as set forth in claim 5, wherein said step of determining the PID value for the branched child process comprising using getid( ), another one of the UNIX system calls.

7. The method as set forth claim 6, wherein the child process performs a process of said NMS communication unit using excel ( ), another one of the UNIX system calls.

8. The method as set forth in claim 7, wherein the status information as to communication progress includes at least one of: an order to start downloading from the NMS GUI unit to the NMS communication unit; an information reporting that the downloading from the NMS GUI unit to the NMS communication unit has started, and reporting the total size of the download data and the size of data sent; an order to stop the downloading from the NMS GUI unit to the NMS communication unit; a message to terminate containing information as to a reason of failure when the downloading from the NMS GUI unit to the NMS communication unit has failed; and a message to terminate containing results information when the downloading from the NMS GUI unit to the NMS communication unit has succeeded.

9. The method as set forth in claim 2, wherein said step of branching to the child process for the NMS communication unit and to the parent process for the NMS GUI unit comprises using a fork( ) call, one of UNIX system calls.

10. The method as set forth in claim 9, wherein said step of determining the value of the child process's ID (PID) by means of the branched parent process comprises determining the value of the child process's ID (PID) as a return value of using the fork( ) call.

11. The method as set forth in claim 10, wherein said step of determining the PID value for the branched child process comprising using getid( ), another one of the UNIX system calls.

12. The method as set forth in claim 11, wherein the child process performs a process of said NMS communication unit using excel( ), another one of the UNIX system calls.

13. The method as set forth in claim 12, wherein the status information as to communication progress includes at least one of: an order to start downloading from the NMS GUI unit to the NMS communication unit; an information reporting that the downloading from the NMS GUI unit to the NMS communication unit has started, and reporting the total size of the download data and the size of data sent; an order to stop the downloading from the NMS GUI unit to the NMS communication unit; a message to terminate containing information as to a reason of failure when the downloading from the NMS GUI unit to the NMS communication unit has failed; and a message to terminate containing results information when the downloading from the NMS GUI unit to the NMS communication unit has succeeded.

14. The method as set forth in claim 1, wherein said step of branching to the child process for the NMS communication unit and to the patent process for the NMS GUI unit comprises using a fork( ) call, one of UNIX system calls.

15. The method as set forth in claim 14, wherein said step of determining the value of the child process's ID (PID) by means of the branched parent process comprises determining the value of the child process's ID (PID) as a return value of using the fork( ) call.

16. The method as set forth in claim 15, wherein said step of determining the PID value for the branched child process comprising using getid( ), another one of the UNIX system calls.

17. The method as set forth in claim 16, wherein the child process performs a process of said NMS communication unit using excel( ), another one of the UNIX system calls.

18. The method as set forth in claim 17, wherein the status information as to communication progress includes at least one of: an order to start downloading from the NMS GUI unit to the NMS communication unit; an information reporting that the downloading from the NMS GUI unit to the NMS communication unit has started, and reporting the total size of the download data and the size of data sent; an order to stop the downloading from the NMS GUI unit to the NMS communication unit; a message to terminate containing information as to a reason of failure when the downloading from the NMS GUI unit to the NMS communication unit has failed; and a message to terminate containing results information when the downloading from the NMS GUI unit to the NMS communication unit has succeeded.

19. A network management system (NMS) for performing a communication procedure requiring long-time interaction in a graphic user interface (GUI) environment, said NMS comprising:

NMS GUI unit means for displaying, in real-time, data relating to progress of the communication procedure; and NMS communication unit means activated by said NMS GUI unit means for using a message queue of an inter-processor communication as an information channel for exchange of information with said NMS GUI unit means;

wherein said NMS GUI unit means receives a command input from a user, determines whether the command input is a communication command, and, when the command input is the communication command, displays status data as to the progress of the communication procedure;

wherein, when the command input is the communication command, said NMS GUI unit means operates as a parent processor, and said NMS communication unit means operates as a child processor subject to said parent processor; and wherein said parent processor determines an identification value of said child processor, generates a message queue for which the determined identification value of the child processor corresponds to an m-type of message queue, sends a communication start command to the child processor, displays a status of waiting for a user input, and displays a communication status.

20. A network management system (NMS) for performing a communication procedure requiring long-time interaction in a graphic user interface (GUI) environment, said NMS comprising:

NMS GUI unit means for displaying, in real-time, data relating to progress of the communication procedure; and NMS communication unit means activated by said NMS GUI unit means for using a message queue of an inter-processor communication as an information channel for exchange of information with said NMS GUI unit means;

wherein said NMS GUI unit means receives a command input from a user, determines whether the command input is a communication command, and, when the command input is the communication command, displays status data as to the progress of the communication procedure;

wherein, when the command input is the communication command, said NMS GUI unit means operates as a parent processor, and said NMS communication unit means operates as a child processor subject to said parent processor; and wherein said child processor determines an identification value of said child processor, and said child processor generates a message queue for which the determined identification value of said child processor corresponds to an m-type of message queue.

21. The NMS as set forth in claim 20, wherein said child processor uses the generated message queue to receive a communication start command from the parent processor.

22. The NMS as set forth in claim 21, wherein said child processor receives the communication start command, and starts to communicate with a target system for management.

23. The NMS as set forth in claim 22, wherein said child processor informs the parent processor of the results of communication with the target system for management through the message queue, and then terminates operations.

* * * * *